UNITED STATES PATENT OFFICE 2,054,140

SUBSTITUTED SULPHONIC ACIDS OF HIGH WETTING, DISPERSING, AND EMULSIFYING POWER AND PROCESS OF PRODUCING THE SAME

Ernest Segessemann, Newark, N. J., assignor to National Oil Products Company, Harrison, N. J., a corporation of New Jersey No Drawing. Application February 8, 1936, Serial No. 63,038

16 Claims. (Cl. 260—64)

This invention relates to substituted aryl sulphonic acids, and more particularly to condensation products of aryl sulphonic acids and terpenes and to a process for making the same.

I have found that aromatic compounds substituted in the nucleus by a terpene radical may be obtained by condensing mono- or polynuclear aromatic hydrocarbons or derivatives thereof with terpenes or with their oxygenated derivatives, using sulphuric acid as a condensing agent. I have also found that the condensation products just described may be converted into sulphonic acid derivatives by condensing a sulphonic acid derivative of an aromatic hydrocarbon with terpenes in the presence of a condensing agent, or the process may also be carried out in a single stage by reacting a mixture of aromatic hydrocarbons and terpenes with strong sulphuric acid, the acid in this case acting as a condensing and sulphonating agent. The quantity of sulphuric acid and the other conditions of sulphonation may be adjusted so as to obtain mono- or polysulphonic acid derivatives.

The process according to the present invention is applicable to all kinds of aromatic compounds which are capable of sulphonation. They may be mono- or polynuclear aromatic hydrocarbons or their homologues, such as for example benzene, toluene, xylene, naphthalene, phenols, amines or naphthols.

The condensation may be carried out with open chain or cyclic terpenes or their alcohols, ketones or esters, such, as for example, terpineols, borneol, fenchyl alcohol, terpin, terpin hydrate, dipentene or with crude materials rich in terpenes, such as pine oil or turpentine.

The condensing and sulphonating agents suitable in accordance with this invention are sulphuric, fuming sulphuric, acetyl sulphuric or chlorsulphonic acid.

Furthermore, I have found that the above described condensation products may be advantageously modified by further condensation with a compound which is capable of reacting with two molecules of the substituted sulphonic acid by forming a carbon or sulphur bridge between two aromatic nuclei, such as for example, aldehydes, ketones or sulphurhalides.

As examples of suitable aldehydes may be cited aliphatic aldehydes, such as formaldehyde or acetaldehyde, or aromatic aldehydes such as benzaldehyde. As an example of ketones applicable for condensation may be mentioned acetone. Of the sulphurhalides, sulphur-monochloride is especially suitable in obtaining a -S-S-bridge between two aromatic nuclei.

All the condensations and sulphonations described in the preceding paragraphs may be advantageously carried out in the presence of an inert solvent such as ethylene chloride or carbon tetrachloride.

I have found that the non-halogenated members of the benzene and naphthalene series and their hydroxy compounds are particularly useful in the formation of the sulphonic acids of their condensation products with unpolymerized terpenes, while in the formation of the bridged products the aromatic compounds are not limited to those above specifically mentioned.

The products obtained in accordance with the present invention in the form of the free acids or their alkali salts are clearly soluble in water and exhibit remarkable wetting, emulsifying and dispersing properties. They can be employed wherever a wetting, cleansing or emulsifying action is required, as for example, in the treatment of textile fibres, in the de-inking of paper stock and in washing spray residues from fruit. They are particularly useful in acid solutions, as for example, in the carbonizing bath or as spreading agents for dilute sulphuric acid used for weed control. They are also applicable in the preparation of emulsions of liquids or solids insoluble in water as for example emulsions of petroleum oils, fatty oils and waxes. Mixtures of the sulphonic acids or their salts with soaps sulphonated oils or other soap-like materials may also be employed with advantage for instance in the dyebath.

The invention will be described in greater detail in the following specific examples which illustrate typical modifications, but the invention is not limited to these examples. The parts are by weight.

Example 1

To a mixture of 108 parts of M-cresol and 154 parts of turpentine are added slowly and with rapid stirring at 15° C. to 20° C. 210 parts of 100% sulphuric acid. The mixture is well stirred for 2 hours and is then allowed to stand at room temperature for 24 hours. The reaction mass which is now clearly soluble in water is then washed substantially free from acid with salt solution and is then neutralized with caustic soda solution. The product may be used as such or the solvent may be distilled off.

Example 2

To a solution of 128 parts of naphthalene in 154 parts of pine oil and 300 parts of ethylene chloride are added with rapid stirring between 20° C. and 30° C. 260 parts of chlorsulphonic acid. The reaction mass is stirred until the evolution of hydrogenchloride has ceased and is then allowed to stand over night at room temperature. The reaction mass is then washed with salt solution, neutralized with soda and the solvent is distilled off as described in Example 1.

*Example 3*

To a mixture of 108 parts of commercial cresylic acid, 136 parts of dipentene and 250 parts of carbontetrachloride 200 parts of fuming sulphuric acid are added between 15° C. and 20° C. and the mass is stirred for 6 hours. To this mixture is then added 29 parts of acetone with rapid stirring, at 20° C.–30° C. The re-action is completed when the mass is clearly soluble in water which requires about 10 hours. The product of reaction is then washed and neutralized and the solvent is distilled off as stated in Example 1.

*Example 4*

To a mixture of 94 parts of phenol, 154 parts of pine oil and 200 parts of ethylene chloride are added with rapid stirring 250 parts of fuming sulphuric acid, keeping the temperature during the reaction between 20° C. and 30° C. The reaction is completed when the mass is clearly soluble in water which requires about 4 hours. At the end of this period 53 parts of benzaldehyde is added, keeping the temperature below 30° C. The mass is agitated for 2 hours and then allowed to stand for 24 hours without agitation. During this time condensation of the benzaldehyde with the substituted sulphonic acids becomes complete. The mass is then washed and neutralized and the solvent is distilled off in the usual manner.

*Example 5*

A mixture of 108 parts of U. S. P. cresol, 154 parts of turpentine, 250 parts of ethylene chloride and 260 parts of chlor-sulphonic acid are subjected to reaction at a temperature of 15° C.–20° C. for 4 hours or until the product is clearly soluble in water. 68 parts of sulphur monochloride is then added slowly and with rapid stirring, while the temperature is maintained between 20° C.–30° C. The mass is then stirred for an additional period of 3 hours and is then washed and finished as cited in Example 1.

*Example 6*

To a solution of 128 parts of naphthalene in 154 parts of pine oil and 200 parts of ethylene chloride are added with rapid stirring at 20° C.–30° C. 300 parts of chlorsulphonic acid. The mixture is then allowed to stand at room temperature for 24 hours. At the end of this period the reaction mass is diluted with 100 parts of water and 38 parts of a 40% formaldehyde solution are then added slowly and with stirring. During this operation the temperature is kept between 20° C. and 40° C. The mass is then stirred for 1 hour or until the formaldehyde odor has completely disappeared. The product of reaction is then washed in salt solution and neutralized and the solvent is distilled off.

I do not limit myself to the times, temperatures, quantities, chemicals or steps of procedure specifically set forth as these are given simply as a means for clearly explaining my invention.

What I claim is:—

1. The process of preparing sulphonic acids of high cleansing, wetting and emulsifying power which consists in condensing an unpolymerized terpene with a member of the group consisting of non-halogenated members of the benzene and naphthalene series and their hydroxy compounds and sulphonating the product.

2. The condensation product obtained by the process of claim 1.

3. The process of preparing sulphonic acids of high cleansing, wetting and emulsifying power which consists in condensing an unpolymerized terpene with a cresol and sulphonating the product.

4. The condensation product obtained by the process of claim 3.

5. The process of preparing sulphonic acids of high cleansing, wetting and emulsifying power which consists in condensing an unpolymerized terpene with m-cresol and sulphonating the product.

6. The condensation product obtained by the process of claim 5.

7. The process of preparing sulphonic acids of high cleansing, wetting and emulsifying power which consists in condensing an unpolymerized pine oil with a member of the group consisting of the non-halogenated members of the benzene and naphthalene series and their hydroxy compounds and sulphonating the product.

8. The condensation product obtained by the process of claim 7.

9. The process of preparing sulphonic acids of high cleansing, wetting and emulsifying power which consists in condensing an unpolymerized pine oil with a cresol and sulphonating the product.

10. The condensation product obtained by the process of claim 9.

11. The process of preparing sulphonic acids of high cleansing, wetting and emulsifying power which consists in condensing an unpolymerized pine oil with m-cresol and sulphonating the product.

12. The condensation product obtained by the process of claim 11.

13. The process of producing sulphonic acids of high cleansing, wetting and emulsifying power which consists in condensing a terpene with a member of the group consisting of the aromatic compounds of the benzene and naphthalene series, sulphonating and condensing the reaction product with a compound capable of forming a bridge linking together several aromatic nuclei.

14. The condensation product obtained by the process of claim 13.

15. The process of producing sulphonic acids of high cleansing, wetting and emulsifying power which consists in condensing a terpene with a member of the group consisting of the aromatic compounds of the benzene and naphthalene series, sulphonating and condensing the reaction product with an aldehyde capable of forming a bridge linking together several aromatic nuclei.

16. The condensation product obtained by the process of claim 15.

ERNEST SEGESSEMANN.

DISCLAIMER 2,054,140.—*Ernest Segessemann*, Newark, N. J. SUBSTITUTED SULPHONIC ACIDS OF HIGH WETTING, DISPERSING, AND EMULSIFYING POWER AND PROCESS OF PRODUCING THE SAME. Patent dated September 15, 1936. Disclaimer filed October 15, 1940, by the assignee, *National Oil Products Co.*

Hereby enters this disclaimer to claims 1, 2, 3, 4, 5, and 6 in said patent.
[*Official Gazette November 5, 1940.*]